United States Patent [19]
Kiesling

[11] 3,842,320
[45] Oct. 15, 1974

[54] PREFABRICATED INSULATED WALL WITH ELECTRICAL CIRCUIT COMPONENTS HOUSED THEREIN

[75] Inventor: Casper Kiesling, Glendale, N.Y.

[73] Assignee: The Raymond Lee Organization, Inc., New York, N.Y.; a part interest

[22] Filed: Aug. 8, 1973

[21] Appl. No.: 386,713

[52] U.S. Cl. ............. 317/99, 317/101 CE, 174/49, 52/221, 307/155
[51] Int. Cl. .......................... H02b 1/04, H05k 7/06
[58] Field of Search ........... 317/99, 101 R, 101 CE, 317/101 D, 101 CB, 112, 117, 118, 120; 307/112, 115, 149, 150, 155; 174/48, 49; 52/220, 221, 309

[56] References Cited
UNITED STATES PATENTS

| | | | |
|---|---|---|---|
| 3,316,624 | 5/1967 | Brudevold | 52/221 |
| 3,462,892 | 8/1969 | Meyer | 174/49 |
| 3,503,167 | 3/1970 | Mackie | 52/309 |
| 3,566,566 | 3/1971 | Janic | 52/221 |
| 3,707,165 | 12/1972 | Stahl | 52/220 |
| 3,774,234 | 11/1973 | Blair | 317/99 |

Primary Examiner—Robert K. Schaefer
Assistant Examiner—Gerald P. Tolin
Attorney, Agent, or Firm—Daniel Jay Tick

[57] ABSTRACT

A prefabricated wall structure comprises electrical insulation material and electrical circuitry supported by the insulation material in mutually insulated relation. The circuitry includes a plurality of electrical conductors. A 6 to 24 volt outlet, a 110 volt outlet, a 240 volt outlet, a 440 volt outlet, a telephone jack, a television cable jack, a call bell jack, and intercom jack, a radio antenna jack, a night light outlet, a wall light connector, switches, a thermostat, a heater, a cooler, and a television antenna jack are connected to corresponding ones of the conductors.

4 Claims, 9 Drawing Figures

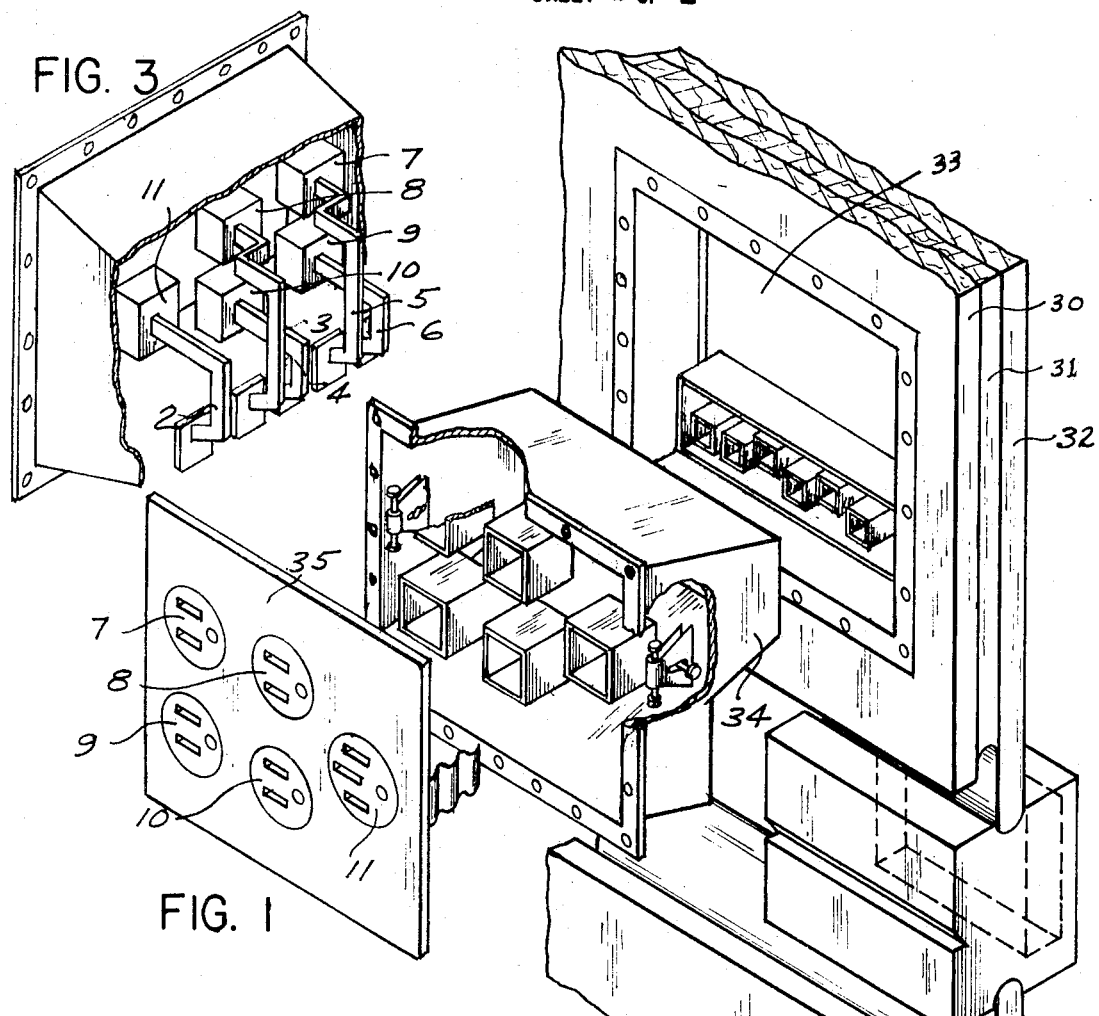
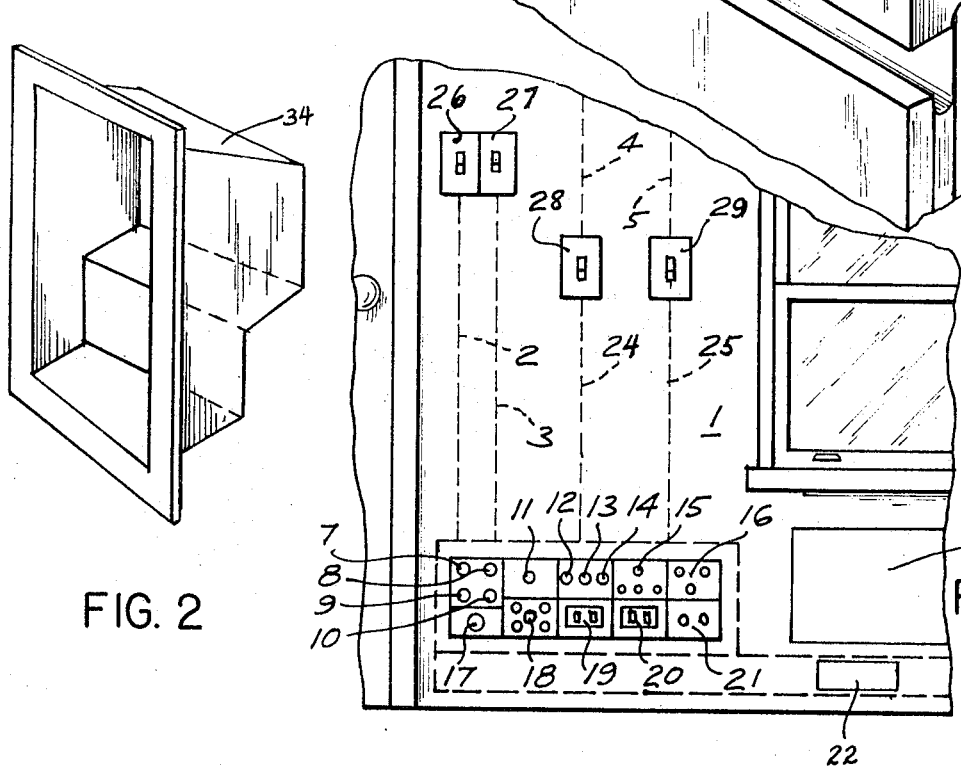

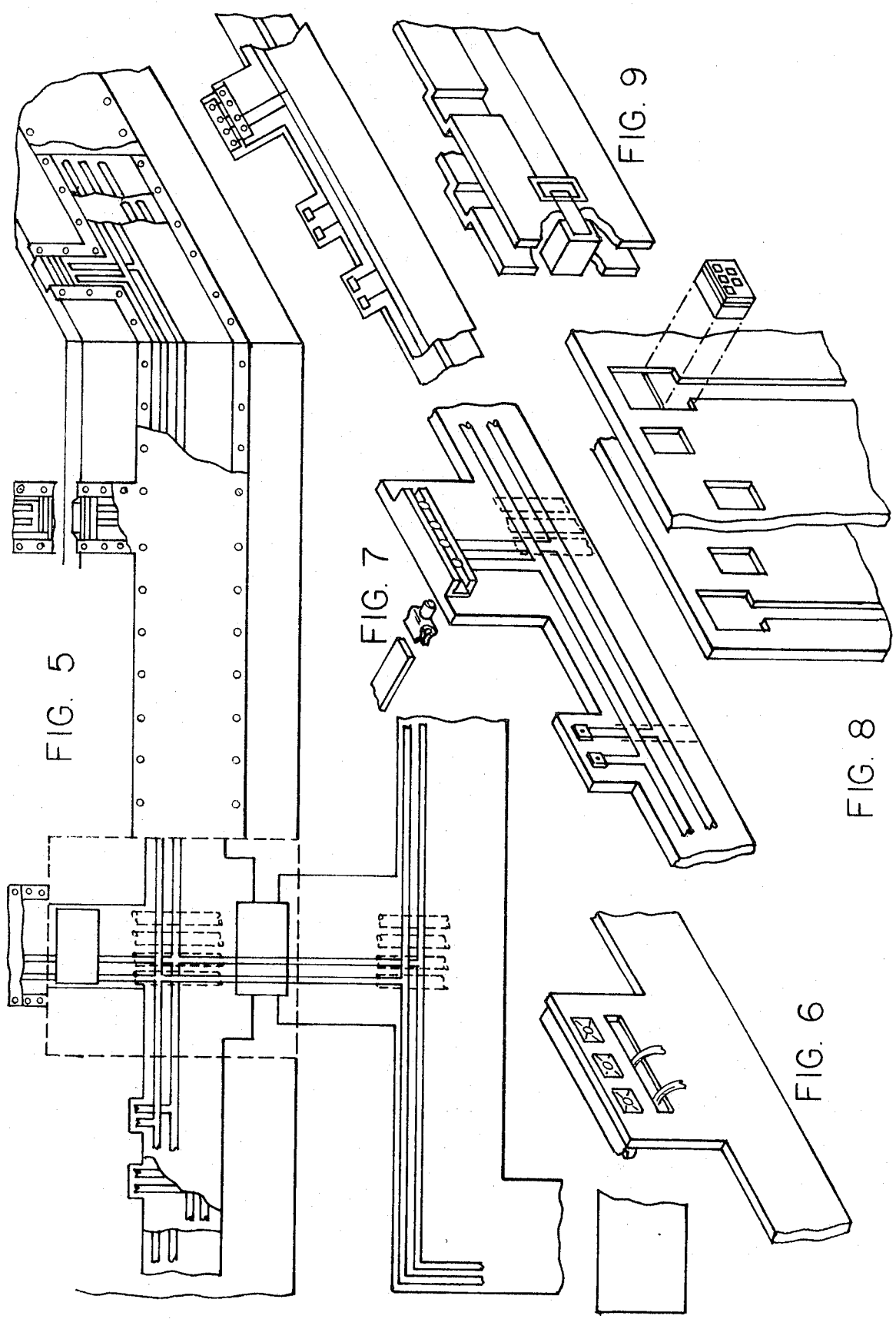

PREFABRICATED INSULATED WALL WITH ELECTRICAL CIRCUIT COMPONENTS HOUSED THEREIN

DESCRIPTION OF THE INVENTION

The present invention relates to a prefabricated wall structure and a method of making such a wall structure.

The principal object of the invention is to provide a prefabricated wall structure which provides all household, commercial, and industrial electrical needs with convenience, facility, safety, effectiveness, efficiency and reliability in operation, which wall structure is installed with facility, convenience and rapidity.

An object of the invention is to provide a prefabricated wall structure which is attractive in appearance and provides ready access to the electrical circuitry and electrical components.

Another object of the invention is to provide a method of making a prefabricated wall structure, which method is inexpensive and accomplished by unskilled labor with facility and ease.

In order that the invention may be readily carried into effect, it will now be described with reference to the accompanying drawing, wherein:

FIG. 1 is an exploded view of part of the prefabricated wall structure of the invention;

FIG. 2 is a schematic diagram of a module or modular member of the prefabricated wall structure of the invention;

FIG. 3 is a cutaway view of a modular member of the prefabricated wall structure of the invention viewed from the back;

FIG. 4 is a front view of part of the prefabricated wall structure of the invention; and FIGS. 5, 6, 7, 8 and 9 are schematic diagrams illustrating the method of making a prefabricated wall structure of the invention.

In the FIGS., the same components are identified by the same reference numerals.

The prefabricated wall structure of the invention comprises electrical insulation material 1 (FIG. 4), and electrical circuitry 2, 3, 4, 5, 6, and so on, supported by the insulation material in mutually insulated relation (FIGS. 3 and 4). The electrical circuitry, 2, 3, 4, 5, 6, and so on, includes a plurality of electrical conductors 2 to 6, and so on.

The electrical circuitry also includes one, two, three, four, or more 6–24 volt outlets 7 (FIGS. 1, 3 and 4), one, two, three, four, or more 110 volt outlets 8 (FIGS. 1, 3 and 4), one, two, three, four or more 240 volt outlets 9 (FIGS. 1, 3 and 4), one, two, three, four or more 440 volt outlets 10 (FIGS. 1, 3 and 4), one, two, three, four or more outlets 11 providing any other desired voltage (FIGS. 1, 3 and 4), telephone jacks 12, 13 and 14 (FIG. 4), a television cable jack 15 (FIG. 4), a call bell jack 16 (FIG. 4), an intercom jack 17 (FIG. 4), a radio antenna connector 20 (FIG. 4), a television antenna jack 21 (FIG. 4), a heater 22 (FIG. 4), a cooler 23 (FIG. 4), and so on.

The electrical circuitry also includes electrical conductors 24 (FIG. 4) for wall lights (not shown in the FIGS.), electrical conductors 25 (FIG. 4) for ceiling lights (not shown in the FIGS.), several other circuits (not shown in the FIGS.), and a plurality of switches, 26, 27, 28, 29, and so on (FIG. 4), for controlling different circuits.

The insulation material 1 comprises sheets 30, 31 and 32 (FIG. 1) of substantially juxtaposed plastic material. One of the sheets of plastic material has the electrical conductors 2, 3, 4, 5, 6, and so on, embedded therein. Another of the sheets of plastic material or group of sheets of plastic material 30, 31 and 32 preferably comprises fiberglass and has a window 33 (FIG. 1) formed therein.

The prefabricated wall structure of the invention comprises a module or modular member 34 (FIGS. 1 and 2) removably inserted in the window 33. The module 34 houses the 6–24 volt outlet 7, the 110 volt outlet 8, the 240 volt outlet 9, the 440 volt outlet 10 and the other outlet 11. Additional windows (not shown in FIGS. 1 to 4) are formed in the wall and accommodate additional modules (not shown in the FIGS.) for housing the other electrical components of the wall. The additional modular members (not shown in the FIGS.) have removably affixed face plates (not shown in the FIGS.) to provide access to the outlets, jacks and connectors housed therein.

The conductors may have adhesive material on a flat surface of each so that they adhere to the corresponding insulation. The adhesive material may be covered by a strip of protective material which may be readily peeled away to expose the adhesive material.

As illustrated in FIGS. 5 to 9, the method of making the prefabricated wall structure of the invention comprises the steps of preparing a sheet of plastic material for supporting a plurality of electrical conductors. An electrically conductive copper sheet is then coated with colored plastic insulating material on one surface and adhesive material on the other surface. A strip of removable protective material is applied to the adhesive material. Wire strips and leads are stamped out or stamp cut out in a plurality of predetermined shapes and dimensions.

Channels of predetermined configurations and dimensions in predetermined patterns are formed in the sheet of plastic material. The protective material is removed from the electrical conductors. The electrical conductors are then inserted in the channels formed in the sheet of plastic material.

Solder clips are affixed to selected points on the electrical conductor and extend from the back of the sheet of plastic material for affixing electrical energizing conductors to the electrical conductors.

The circuit strips are highly flexible and easily creased, so that they may be bent 90° around a room without utilizing too much space. The circuit strips are readily accessible. The electrical conductors have grooves formed therein at selected points to enable them to cross over each other without contact and are preferably spaced at least ⅛ inch apart to prevent short-circuiting.

The panel sections of the prefabricated wall structure of the invention are preferably 4 by 8 feet to enable them to pass through door openings of buildings. Enough space is provided behind the panels to permit the installation of television receivers, radios, tape recorders, computers, machinery, intercom systems, telephone equipment, and other equipment.

The 6 volt outlet may be utilized for burglar alarms, toys and electric train sets, and so on. The 12 volt and 24 volt outlets may be utilized for fire alarms, battery chargers, and so on. The 110 volt outlets are utilized generally. The 220 volt outlets are utilized for air conditioners, dryers, kitchen appliances, shop equipment, industrial equipment, motors, and so on. The 270 volt outlets are utilized for fluorescent lighting fixtures and industrial applications. The 440 volt outlets are utilized for heavy duty industrial applications.

The prefabricated wall structure of the invention may, of course, be utilized as a ceiling structure, as well as a wall structure. The fiberglass material preferably has a metal screen molded or embedded therein and has channeling formed therein at approximately 6 inch intervals. The channels are 1 and 2 inches in width. This provides structural strength and permits nails to be driven into the beam of a frame house. Furring strips are set into the channels to prepare the surface for wall materials such as, for example, sheet rock or wood paneling, which may be held by being nailed into such furring strips to avoid warping and bulging.

The panels may be held to an exterior wall by two rear magnets and an iron plate set in the concrete of the wall. The panels may also support rubber block magnets to prepare the finished wall surface with material such as formica, wall paper, or any suitable wall covering surface. The magnets are attacted to iron filings, which are premagnetized powdered particles, due to the weak magnetic attraction between magnets spaced more than 6 inches from each other. Styrofoam spacers are provided between the magnets to maintain a smooth surface for receiving the wall finishing material. The iron filings are supported on the wall finishing material by lacquer or varnish. The principal purpose of the front magnets is to permit rapid removal of the surface finishing material and to permit changing of the surface finishing material without the need for glue, nails, or the like.

The paneling may be used with or without the styrofoam insulating spacers. In remodeling an old structure, all molding, wood baseboard and the like is removed and plaster sections and lathing are broken to the depth of the module contact boxes. Nails are used instead of magnets to affix the paneling to the studs. The front magnets are then inserted and styrofoam spacers are provided therebetween.

While the invention has been described by means of specific examples and in specific embodiments, I do not wish to be limited thereto, for obvious modifications will occur to those skilled in the art without departing from the spirit and scope of the invention.

I claim:

1. A prefabricated wall structure, comprising electrical insulation material and electrical circuitry supported by the insulation material in mutually insulated relation, the circuitry including a plurality of electrical conductors, a plurality of outlet means providing different voltages, a plurality of jack means for a plurality of different facilities, further outlet means, switch means, and a plurality of electrical equipment and electrical appliances connected to corresponding ones of the conductors, the insulation material comprising sheets of substantially juxtaposed plastic material, a first of the sheets having the electrical conductors embedded therein and a second of the sheets having a window formed therein, a modular member removably inserted in the window and housing the outlet means and the jack means, and connector means and thermostat means housed in the modular member.

2. A prefabricated structure as claimed in claim 1, wherein the second sheet of insulating material comprises woven glass material.

3. A prefabricated wall structure as claimed in claim 2, wherein the modular member has a removably affixed face plate providing access to the outlet means, the jack means, the connector means and the thermostat means.

4. A prefabricated wall structure as claimed in claim 1, further comprising magnet means on one of the sheets of plastic material and styrofoam spacers between adjacent magnet means for providing a smooth surface for affixing the structure magnetically to an exterior wall.

* * * * *